(12) United States Patent
Li et al.

(10) Patent No.: US 12,272,973 B2
(45) Date of Patent: Apr. 8, 2025

(54) ENERGY STORAGE SYSTEM AND METHOD FOR CONTROLLING ENERGY STORAGE SYSTEM

(71) Applicant: Huawei Digital Power Technologies Co., Ltd., Shenzhen (CN)

(72) Inventors: Jianshan Li, Shanghai (CN); He Zhou, Shanghai (CN); Shijiang Yu, Shanghai (CN); Zhipeng Wu, Shenzhen (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 508 days.

(21) Appl. No.: 17/719,130

(22) Filed: Apr. 12, 2022

(65) Prior Publication Data
US 2022/0329082 A1 Oct. 13, 2022

(30) Foreign Application Priority Data
Apr. 12, 2021 (CN) .......................... 202110388542.0

(51) Int. Cl.
*H02J 7/00* (2006.01)
(52) U.S. Cl.
CPC .......... *H02J 7/0019* (2013.01); *H02J 7/0047* (2013.01)
(58) Field of Classification Search
USPC ....................................................... 320/137
See application file for complete search history.

(56) References Cited

U.S. PATENT DOCUMENTS

| 2014/0042815 A1 | 2/2014 | Maksimovic et al. |
| 2016/0218528 A1* | 7/2016 | Sugeno .................... B60L 53/64 |
| 2019/0288520 A1 | 9/2019 | Abdel-Monem et al. |
| 2021/0028503 A1* | 1/2021 | Hilligoss ............. H02M 3/1582 |

FOREIGN PATENT DOCUMENTS

| CN | 1402375 A | 3/2003 |
| CN | 203135473 U | 8/2013 |
| CN | 203398816 U | 1/2014 |
| CN | 105337327 A | 2/2016 |

(Continued)

OTHER PUBLICATIONS

Peng et al., "Study on energy transfer equalization strategies and its circuit implementation for lithium iron phosphate battery," Chinese Journal of Power Sources, vol. 44, No. 6, pp. 875-879 (Jun. 2020). With an English abstract.

*Primary Examiner* — Samuel Berhanu
(74) *Attorney, Agent, or Firm* — Leydig, Voit & Mayer, Ltd.

(57) ABSTRACT

An energy storage system and a method for controlling the energy storage system, includes a plurality of energy storage units. The energy storage unit includes a plurality of battery cells, a plurality of balancing units, a voltage conversion unit, a first switch, a second switch, and a control unit. The control unit is configured to detect fault cases of the plurality of battery cells, and control open and closed states of the first switch and the second switch. According to the application, it can be ensured that each energy storage unit in the energy storage system can continuously work when a battery cell is faulty and when state of charge balance between battery cells is implemented, thereby greatly improving reliability of the energy storage system with low costs.

14 Claims, 6 Drawing Sheets

(56) References Cited

FOREIGN PATENT DOCUMENTS

| | | | |
|---|---|---|---|
| CN | 108448713 | A | 8/2018 |
| CN | 108736531 | A | 11/2018 |
| CN | 109149683 | A | 1/2019 |
| CN | 109921490 | A | 6/2019 |
| CN | 110912235 | A | 3/2020 |

\* cited by examiner

ENERGY STORAGE SYSTEM AND METHOD FOR CONTROLLING ENERGY STORAGE SYSTEM

CROSS-REFERENCE TO RELATED APPLICATION

This application claims priority to Chinese Patent Application No. 202110388542.0, filed on Apr. 12, 2021, which is hereby incorporated by reference in its entirety.

TECHNICAL FIELD

Embodiments of this application relate to the field of battery energy storage technologies, and in particular, to an energy storage system and a method for controlling an energy storage system.

BACKGROUND

A battery energy storage system mainly uses batteries to store electric energy. A conventional battery energy storage system usually consists of a plurality of battery clusters connected in parallel. Each battery cluster usually requires a plurality of battery packs connected in series. In addition, if a larger quantity of battery packs connected in series are required, each battery pack imposes higher impact on the energy storage system. If a battery pack in the battery cluster is faulty or fails, the entire battery cluster is no longer available until onsite O&M personnel repair or replace the faulty battery pack. Therefore, maintenance costs of the battery cluster are relatively high, working efficiency of the energy storage system is also reduced, and time resources are wasted.

In the conventional battery energy storage system, even if battery packs connected in series are completely consistent initially, a performance difference inevitably exists between the battery packs in a subsequent long-term process, and it is difficult to achieve state of charge (SOC) balance between the battery packs. SOC imbalance between the battery packs causes a small-capacity battery pack to fail in advance. Consequently, an entire battery cluster fails, a service life of the battery cluster is shortened, an effective capacity of the battery cluster is reduced, and safety performance of the battery cluster is deteriorated.

Therefore, an energy storage system is urgently required to achieve state of charge balance between battery packs and continuously work when a battery cell is faulty, so that reliability of the energy storage system is improved and time costs are reduced.

SUMMARY

This application provides an energy storage system and a method for controlling an energy storage system, to implement SOC balance between battery cells and ensure that each energy storage unit in the energy storage system can continuously work when a battery cell is faulty.

According to a first aspect, an energy storage unit is provided. The energy storage unit includes: a battery string, where the battery string includes a plurality of battery cells; a plurality of balancing units, where the plurality of balancing units are in a one-to-one correspondence with the plurality of battery cells, each battery cell is connected in parallel to an input end of a balancing unit corresponding to the battery cell, output ends of the plurality of balancing units are connected in parallel, positive output ends of the plurality of balancing units are connected to a positive balancing bus, negative output ends of the plurality of balancing units are connected to a negative balancing bus, and the plurality of balancing units are configured to control state of charge balance between the battery cells; a voltage conversion unit, configured to perform voltage conversion, where a positive input end of the voltage conversion unit is connected to a positive electrode of the battery string by using a battery bus, and a negative input end and a negative output end of the voltage conversion unit are grounded; a first switch, disposed between the positive electrode of the battery string and the positive input end of the voltage conversion unit; a second switch, disposed between the positive balancing bus and the positive input end of the voltage conversion unit; and a control unit, configured to: control the first switch to be closed and the second switch to be open, so that the voltage conversion unit receives a voltage by using the battery bus; or control the first switch to be open and the second switch to be closed, so that the voltage conversion unit receives a voltage by using the positive balancing bus.

According to the solution of this application, the battery cells can perform charging/discharging by using the plurality of balancing units, to achieve SOC balance, and a corresponding charge/discharge current may be transferred by using the positive balancing bus and the negative balancing bus. In addition, a connection relationship between the battery cells in a charging/discharging process of the energy storage unit can be changed only by controlling connection statuses of the first switch and the second switch by the control unit, to ensure continuous working of the energy storage unit when one or some battery cells are faulty. The control manner is easy to implement, implementation costs are relatively low, and reliability of the energy storage system can be significantly improved only with relatively low costs.

For example, when the battery cells are not faulty, the control unit may control the first switch to be closed and the second switch to be open, so that the voltage conversion unit receives the voltage by using the battery bus. In this case, the connection relationship between the plurality of battery cells in the charging/discharging process of the energy storage unit may be equivalently considered as a series connection. In this case, the plurality of battery cells are connected in series, so that the energy storage unit obtains maximum output power, battery resources are fully used, and benefits are maximized. When a battery cell is faulty, the control unit may control the first switch to be open and the second switch to be closed, so that the voltage conversion unit receives the voltage by using the positive balancing bus. In this case, the connection relationship between the plurality of battery cells in the charging/discharging process of the energy storage unit may be equivalently considered as a parallel connection, a fault of one or some battery cells does not affect continuous working of the energy storage unit, and other battery cells that are not faulty can still perform charging/discharging.

It should be understood that a voltage difference between the balancing bus and the battery bus is usually relatively large. In consideration of circuit safety, the balancing bus cannot be directly connected to the battery bus. Therefore, if the control unit needs to perform switching on the first switch and the second switch when a battery cell in the energy storage unit is faulty, there is a time sequence requirement for performing switching on the first switch and the second switch, and the control unit needs to open the first switch before closing the second switch.

With reference to the first aspect, in some implementations of the first aspect, the negative balancing bus is grounded; and the control unit is specifically configured to: when the plurality of battery cells are not faulty, control the first switch to be closed and the second switch to be open; or when one or more of the plurality of battery cells are faulty, control the first switch to be open and the second switch to be closed.

It should be noted that, when the battery cells are not faulty, the voltage conversion unit receives the voltage by using the battery bus. In this case, the balancing bus is isolated from the battery bus, and the balancing bus is in a floating state. Therefore, the balancing bus may or may not be grounded. However, when a battery cell is faulty, the control unit controls the first switch to be open and the second switch to be closed, and in this case, the voltage conversion unit receives the voltage by using the positive balancing bus. To prevent balancing units connected to the balancing bus from being failed because the positive balancing bus receives an excessively high voltage, the negative balancing bus needs to be grounded. In this implementation, the negative balancing bus is grounded when the battery cells are not faulty and when a battery cell is faulty.

With reference to the first aspect, in some implementations of the first aspect, the energy storage unit further includes a third switch, disposed between the negative balancing bus and the negative input end of the voltage conversion unit; and the control unit is specifically configured to: when the plurality of battery cells are not faulty, control the first switch to be closed, the second switch to be open, and the third switch to be open; or when one or more of the plurality of battery cells are faulty, control the first switch to be open, the second switch to be closed, and the third switch to be closed.

In this implementation, using the third switch can enable the negative balancing bus to be grounded only when a battery cell is faulty, and the third switch can prevent all balancing units from being failed because a high voltage is applied to the positive balancing bus, for example, prevent all the balancing units from being failed because a high voltage is applied to the positive balancing bus when conglutination occurs in the second switch or a time sequence for performing switching on the first switch and the second switch is incorrect.

With reference to the first aspect, in some implementations of the first aspect, the energy storage unit further includes: a plurality of fourth switches, where each battery cell is connected in series to a fourth switch corresponding to the battery cell; and a plurality of fifth switches, where the plurality of fourth switches, the plurality of fifth switches, and the plurality of battery cells are in a one-to-one correspondence, and each battery cell is connected in parallel to a fifth switch corresponding to the battery cell.

With reference to the first aspect, in some implementations of the first aspect, the control unit is specifically configured to: when a quantity of faulty battery cells in the plurality of battery cells is less than a preset threshold, control the first switch to be closed, the second switch to be open, a fourth switch corresponding to the faulty battery cell to be open, and a fifth switch corresponding to the faulty battery cell to be closed; or when a quantity of faulty battery cells in the plurality of battery cells is greater than or equal to the preset threshold, control the first switch to be open, the second switch to be closed, a fourth switch corresponding to the faulty battery cell to be closed, and a fifth switch corresponding to the faulty battery cell to be open.

It should be noted that the plurality of fourth switches are configured to connect battery cells that are not faulty. In other words, when a battery cell is faulty, a fourth switch corresponding to the faulty battery cell is in an open state, which is equivalent to removing the faulty battery cell from the energy storage unit. The plurality of fifth switches are configured to bypass faulty battery cells corresponding to the plurality of fifth switches. In other words, when a battery cell is faulty, a fifth switch corresponding to the faulty battery cell is in a closed state, and a function implemented by the fifth switch may be equivalently considered as a wire.

In this implementation, there are two battery cell fault cases based on the quantity of faulty battery cells. In the first fault case, the quantity of faulty battery cells in the plurality of battery cells is less than the preset threshold. In the second fault case, the quantity of faulty battery cells in the plurality of battery cells is greater than or equal to the preset threshold. In the first fault case, the control unit controls connection statuses of the fourth switch and the fifth switch that correspond to the faulty battery cell, to remove the faulty battery cell from the energy storage unit, so that it is ensured that a battery cell that is not faulty in the energy storage unit can still continuously work. In the second fault case, the control unit controls the connection statuses of the first switch and the second switch, so that the voltage conversion unit receives the voltage by using the positive balancing bus. In this case, the connection relationship between the plurality of battery cells in the charging/discharging process of the energy storage unit may be equivalently considered as being changed from a series connection to a parallel connection, a fault of one or some battery cells does not affect continuous working of the energy storage unit, and the voltage conversion unit can still perform charging/discharging management on other battery cells that are not faulty.

According to a second aspect, a method for controlling an energy storage unit is provided. The energy storage unit includes a battery string, a plurality of balancing units, a voltage conversion unit, a first switch, a second switch, and a control unit. The battery string includes a plurality of battery cells. The plurality of balancing units are in a one-to-one correspondence with the plurality of battery cells, each battery cell is connected in parallel to an input end of a balancing unit corresponding to the battery cell, output ends of the plurality of balancing units are connected in parallel, positive output ends of the plurality of balancing units are connected to a positive balancing bus, negative output ends of the plurality of balancing units are connected to a negative balancing bus, and the plurality of balancing units are configured to control state of charge balance between the battery cells. The voltage conversion unit is configured to perform voltage conversion, a positive input end of the voltage conversion unit is connected to a positive electrode of the battery string by using a battery bus, and a negative input end and a negative output end of the voltage conversion unit are grounded. The first switch is disposed between the positive electrode of the battery string and the positive input end of the voltage conversion unit. The second switch is disposed between the positive balancing bus and the positive input end of the voltage conversion unit. The method includes: The control unit controls the first switch to be closed and the second switch to be open, so that the voltage conversion unit receives a voltage by using the battery bus; or the control unit controls the first switch to be open and the second switch to be closed, so that the voltage conversion unit receives a voltage by using the positive balancing bus.

According to the solution of this application, the battery cells can perform charging/discharging by using the plurality of balancing units, to achieve SOC balance, and a corresponding charge/discharge current may be transferred by using the positive balancing bus and the negative balancing bus. In addition, a connection relationship between the battery cells in a charging/discharging process of the energy storage unit can be changed only by controlling connection statuses of the first switch and the second switch by the control unit, to ensure continuous working of the energy storage unit when one or some battery cells are faulty. The control manner is easy to implement, implementation costs are relatively low, and reliability of the energy storage system can be significantly improved only with relatively low costs.

For example, in the method, when the battery cells are not faulty, the control unit may control the first switch to be closed and the second switch to be open, so that the voltage conversion unit receives the voltage by using the battery bus. In this case, the connection relationship between the plurality of battery cells in the charging/discharging process of the energy storage unit may be equivalently considered as a series connection. In this case, the plurality of battery cells are connected in series, so that the energy storage unit obtains maximum output power, battery resources are fully used, and benefits are maximized. When a battery cell is faulty, the control unit may control the first switch to be open and the second switch to be closed, so that the voltage conversion unit receives the voltage by using the positive balancing bus. In this case, the connection relationship between the plurality of battery cells in the charging/discharging process of the energy storage unit may be equivalently considered as a parallel connection, a fault of one or some battery cells does not affect continuous working of the energy storage unit, and other battery cells that are not faulty can still perform charging/discharging.

It should be understood that a voltage difference between the balancing bus and the battery bus is usually relatively large. In consideration of circuit safety, the balancing bus cannot be directly connected to the battery bus. Therefore, in the control method, if the control unit needs to perform switching on the first switch and the second switch when a battery cell in the energy storage unit is faulty, there is a time sequence requirement for performing switching on the first switch and the second switch, and the control unit needs to open the first switch before closing the second switch.

With reference to the second aspect, in some implementations of the second aspect, the negative balancing bus is grounded, and the method further includes: The control unit detects whether the plurality of battery cells are faulty. That the control unit controls the first switch to be closed and the second switch to be open, so that the voltage conversion unit receives a voltage by using the battery bus includes: When the plurality of battery cells are not faulty, the control unit controls the first switch to be closed and the second switch to be open. That the control unit controls the first switch to be open and the second switch to be closed, so that the voltage conversion unit receives a voltage by using the positive balancing bus includes: When one or more of the plurality of battery cells are faulty, the control unit controls the first switch to be open and the second switch to be closed.

It should be noted that, when the battery cells are not faulty, the voltage conversion unit receives the voltage by using the battery bus. In this case, the balancing bus is isolated from the battery bus, and the balancing bus is in a floating state. Therefore, the balancing bus may or may not be grounded. However, when a battery cell is faulty, the control unit controls the first switch to be open and the second switch to be closed, and in this case, the voltage conversion unit receives the voltage by using the positive balancing bus. To prevent balancing units connected to the balancing bus from being failed because the positive balancing bus receives an excessively high voltage, the negative balancing bus needs to be grounded. In this implementation, the negative balancing bus is grounded when the battery cells are not faulty and when a battery cell is faulty.

With reference to the second aspect, in some implementations of the second aspect, the energy storage unit further includes a third switch, and the third switch is disposed between the negative balancing bus and the negative input end or the negative output end of the voltage conversion unit. The method further includes: The control unit detects whether the plurality of battery cells are faulty. That the control unit controls the first switch to be closed and the second switch to be open, so that the voltage conversion unit receives a voltage by using the battery bus includes: When the plurality of battery cells are not faulty, the control unit controls the first switch to be closed, the second switch to be open, and the third switch to be open. That the control unit controls the first switch to be open and the second switch to be closed, so that the voltage conversion unit receives a voltage by using the positive balancing bus includes: When one or more of the plurality of battery cells are faulty, the control unit controls the first switch to be open, the second switch to be closed, and the third switch to be closed.

In this implementation, the control unit controls the third switch, so that the negative balancing bus can be grounded only when a battery cell is faulty, and the third switch can prevent all balancing units from being failed because a high voltage is applied to the positive balancing bus, for example, prevent all the balancing units from being failed because a high voltage is applied to the positive balancing bus when conglutination occurs in the second switch or a time sequence for performing switching on the first switch and the second switch is incorrect.

With reference to the second aspect, in some implementations of the second aspect, the energy storage unit further includes: a plurality of fourth switches, where each battery cell is connected in series to a fourth switch corresponding to the battery cell; and a plurality of fifth switches, where the plurality of fourth switches, the plurality of fifth switches, and the plurality of battery cells are in a one-to-one correspondence, and each battery cell is connected in parallel to a fifth switch corresponding to the battery cell. The method further includes: The control unit detects whether the plurality of battery cells are faulty. That the control unit controls the first switch to be closed and the second switch to be open, so that the voltage conversion unit receives a voltage by using the battery bus includes: When a quantity of faulty battery cells in the plurality of battery cells is less than a preset threshold, the control unit controls the first switch to be closed, the second switch to be open, a fourth switch corresponding to the faulty battery cell to be open, and a fifth switch corresponding to the faulty battery cell to be closed. That the control unit controls the first switch to be open and the second switch to be closed, so that the voltage conversion unit receives a voltage by using the positive balancing bus includes: When a quantity of faulty battery cells in the plurality of battery cells is greater than or equal to the preset threshold, the control unit controls the first switch to be open, the second switch to be closed, a fourth switch corresponding to the faulty battery cell to be closed, and a fifth switch corresponding to the faulty battery cell to be open.

It should be noted that the plurality of fourth switches are configured to connect battery cells that are not faulty. In other words, when a battery cell is faulty, a fourth switch corresponding to the faulty battery cell is in an open state, which is equivalent to removing the faulty battery cell from the energy storage unit. The plurality of fifth switches are configured to bypass faulty battery cells corresponding to the plurality of fifth switches. In other words, when a battery cell is faulty, a fifth switch corresponding to the faulty battery cell is in a closed state, and a function implemented by the fifth switch may be equivalently considered as a wire.

In this implementation, there are two battery cell fault cases based on the quantity of faulty battery cells. In the first fault case, the quantity of faulty battery cells in the plurality of battery cells is less than the preset threshold. In the second fault case, the quantity of faulty battery cells in the plurality of battery cells is greater than or equal to the preset threshold. In the first fault case, the control unit controls connection statuses of the fourth switch and the fifth switch that correspond to the faulty battery cell, to remove the faulty battery cell from the energy storage unit, so that it is ensured that a battery cell that is not faulty in the energy storage unit can still continuously work. In the second fault case, the control unit controls the connection statuses of the first switch and the second switch, so that the voltage conversion unit receives the voltage by using the positive balancing bus. In this case, the connection relationship between the plurality of battery cells in the charging/discharging process of the energy storage unit may be equivalently considered as being changed from a series connection to a parallel connection, a fault of one or some battery cells does not affect continuous working of the energy storage unit, and the voltage conversion unit can still perform charging/discharging management on other battery cells that are not faulty.

According to a third aspect, an energy storage system is provided. The energy storage system includes at least one energy storage unit in any one of the possible implementations of the first aspect.

With reference to the third aspect, in some implementations of the third aspect, the energy storage system further includes a bus bar and at least one inverter, the bus bar is configured to integrate currents output by energy storage units in the energy storage system, and the inverter is configured to: convert a direct current into an alternating current and output the alternating current to a power grid.

According to a fourth aspect, a method for controlling an energy storage system is provided. The control method corresponds to a method for controlling an energy storage unit included in the energy storage system in the third aspect.

DESCRIPTION OF EMBODIMENTS

To make the objectives, technical solutions, and advantages of embodiments of this application clearer, the following clearly describes the technical solutions in the embodiments of this application with reference to accompanying drawings in the embodiments of this application. It is clear that, the described embodiments are merely some rather than all of the embodiments of this application. All other embodiments obtained by a person of ordinary skill in the art based on the embodiments of this application without creative efforts shall fall within the protection scope of this application.

Figure 1:
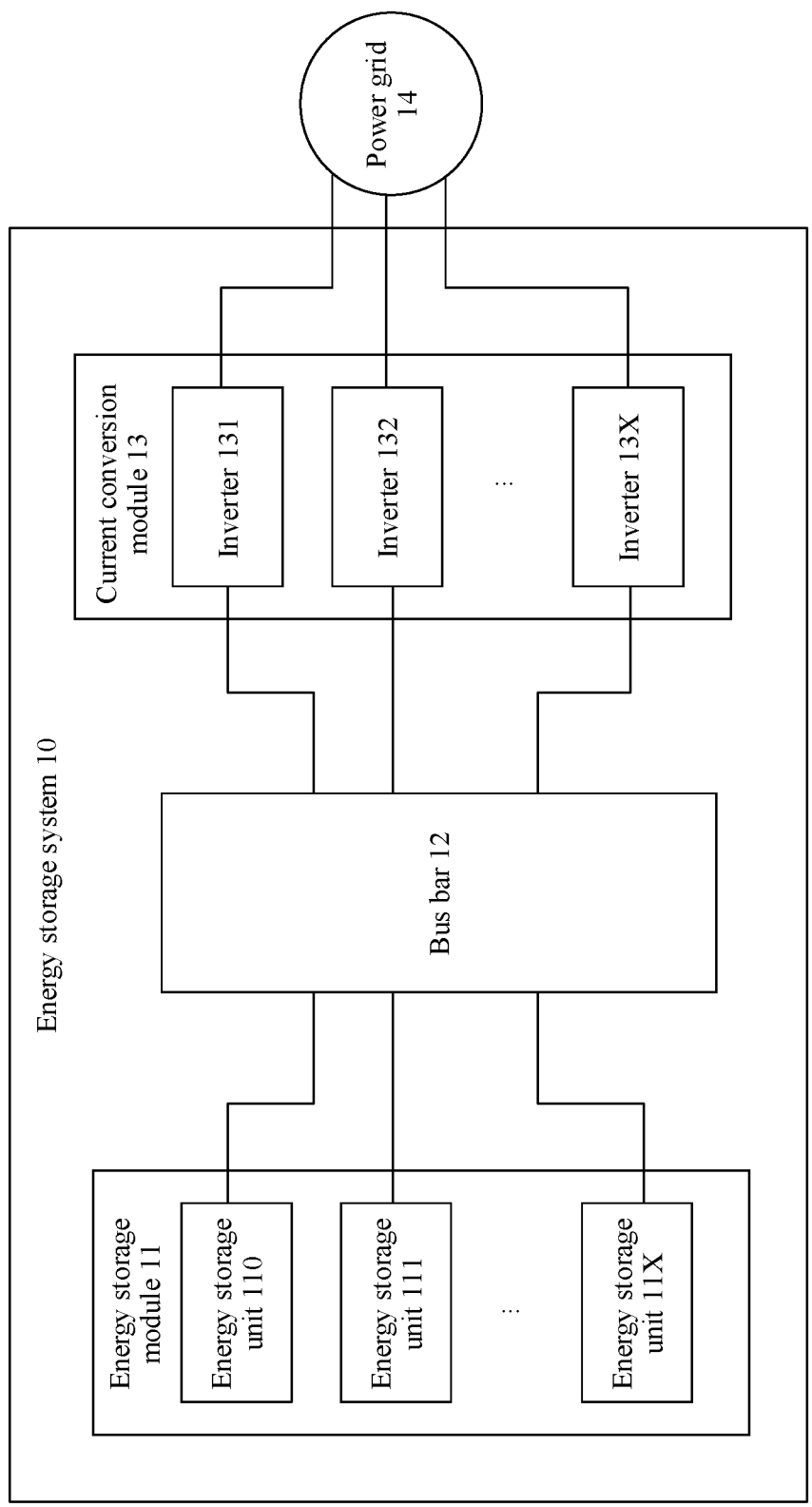
FIG. 1 is a schematic diagram of a structure applicable to an application scenario of an embodiment of this application.

To facilitate understanding of the embodiments of this application, an application scenario of this application is first described with reference to FIG. 1. FIG. 1 is a schematic diagram of a structure applicable to an application scenario of an embodiment of this application. As shown in FIG. 1, the energy storage system 10 may be configured to store electric energy. Specifically, the energy storage system 10 may be charged by a power grid 14, and the energy storage system 10 may also generate an alternating current and supply the generated alternating current to the power grid 14. The energy storage system 10 may include an energy storage module 11, a bus bar 12, and a current conversion module 13. The energy storage module 11 may include a plurality of energy storage units, for example, an energy storage unit 110 and an energy storage unit 111. The current conversion module 13 may include a plurality of inverters, for example, an inverter 131 and an inverter 132. The energy storage module 11 is configured to store energy, and output a current to the bus bar 12 or receive a current from the bus bar 12. The bus bar 12 is configured to integrate a current provided by the energy storage module 11 or a current provided by the power grid 14. The current conversion module 13 is configured to convert a direct current provided by the energy storage module 11 into an alternating current, and input the current to the power grid 14, or converts an alternating current provided by the power grid 14 into a direct current, to charge the energy storage module 11. The system in FIG. 1 is merely intended to describe an application scenario of the embodiments of this application, but is not intended to limit this application.

It should be understood that a connection relationship of the circuit is not limited in this embodiment of this application. In actual application, other devices may be further connected between the components in FIG. 1. For example, the output end of the current conversion module 13 may be directly connected to the power grid, or may be connected to the power grid by using a transformer, this is not limited in this application.

Figure 2:
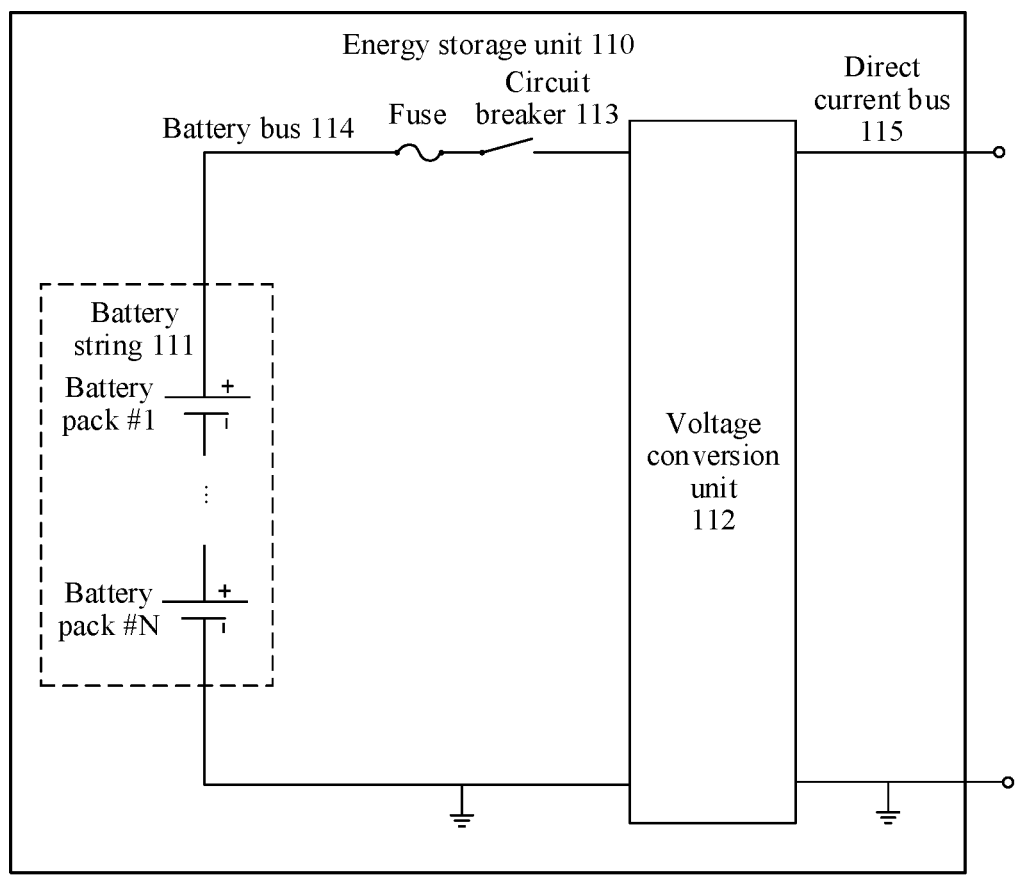
FIG. 2 is a schematic diagram of a conventional energy storage unit.

The following uses a conventional energy storage unit 110 in FIG. 2 as an example to describe a structure of a conventional energy storage system. The energy storage unit 110 mainly includes a battery string 111, a voltage conversion unit 112, a circuit breaker 113, a battery bus 114, and a direct current bus 115. The battery string 111 is formed by connecting a battery pack #1, a battery pack #2, and a battery pack #N in series, and each battery pack is formed by connecting one or more electrochemical cells in series (FIG. 2 uses only one electrochemical cell as an example), where N is a positive integer. A positive input end of the voltage conversion unit 112 is connected to a positive electrode of the battery string by using the battery bus 114. The circuit breaker 113 is disposed on the battery bus 114. The direct current bus 115 is connected to a positive output end of the voltage conversion unit 112.

First, in the conventional energy storage system 110, even if performance parameters of the battery packs #1 to #N connected in series are completely the same at an initial stage, a performance difference is inevitable between the battery packs in a subsequent long-term process, and it is difficult to implement balance between the battery packs. For battery packs connected in series, large-capacity battery packs are always in shallow charge and discharge with small currents, resulting in slow capacity attenuation and a prolonged service life. Small-capacity battery packs are always in overcharge and overdischarge with large currents, capacity attenuation of the battery pack is accelerated, and a service life of the battery pack is shortened. In addition, a performance parameter difference between the two battery packs is increasingly large, and a positive feedback feature is formed. Small-capacity battery packs fail in advance, thereby causing a failure of an entire battery cluster. Imbalance between battery packs shortens a service life of the battery cluster, reduces an effective capacity of the battery cluster, and reduces safety performance of the battery cluster.

Second, a voltage and a capacity of the energy storage system are mainly determined by a battery cluster that forms the energy storage system, and a voltage and a capacity of each battery cluster are determined by a quantity of battery packs connected in series in the battery cluster. In addition, because a voltage of a single battery pack is low. Therefore, each battery cluster generally includes a plurality of battery packs connected in series. In addition, a higher voltage requirement and a larger capacity requirement of the energy storage system indicate a larger quantity of battery packs connected in series in each battery cluster. Therefore, each battery pack has a higher degree of impact on the entire battery cluster. For example, for a large-capacity energy storage application, especially an energy storage container application, if a battery pack in a battery cluster is faulty, an entire battery cluster is shut down and waits for onsite O&M personnel to repair or replace the faulty battery pack. In addition, the battery pack consumes power during storage, therefore, the energy storage system usually does not provide a backup battery pack. Even if a backup battery pack is provided, the backup battery pack needs to be charged and discharged periodically to prevent battery damage due to overdischarge. On one hand, maintenance costs increase. On the other hand, material costs of spare battery packs are also high.

For the foregoing problem, this application provides an energy storage system, which can not only implement SOC balance between battery cells, but also ensure continuous operation of each energy storage unit when a specific battery cell or some battery cells are faulty. The energy storage system includes one or more energy storage units connected in parallel.

Figure 3:
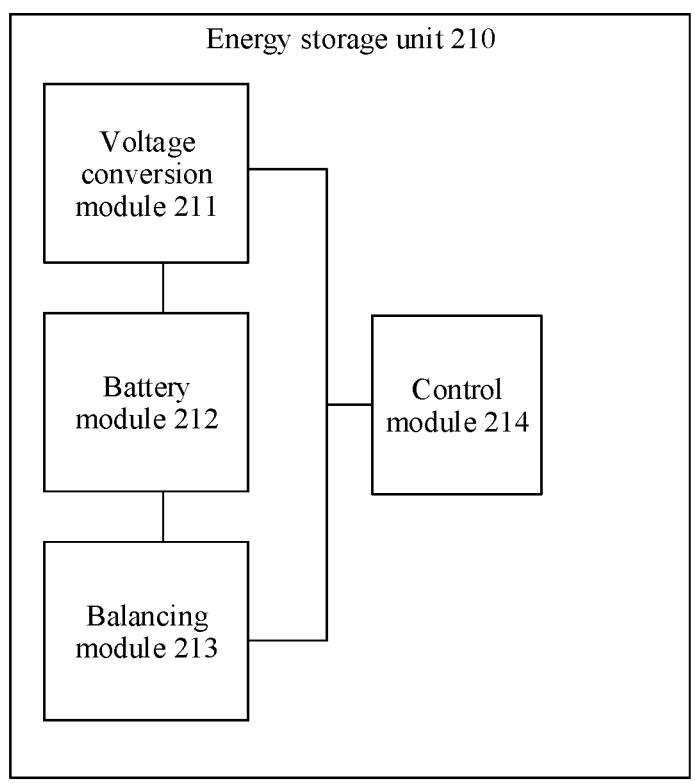
FIG. 3 is a schematic diagram of an energy storage unit according to an embodiment of this application.

With reference to FIG. 3, the following describes an energy storage unit in this application by using an energy storage unit 210 as an example. The energy storage unit 210 includes a voltage conversion module 211, a battery module 212, a balancing module 213, and a control module 214. The battery module 212 is configured to store electric energy or provide electric energy. The voltage conversion module 211 is configured to perform charging/discharging management on the battery module 212. The balancing module 213 is configured to implement SOC balancing of the battery module 212. The control module 214 is configured to ensure that the energy storage unit 210 can still work continuously when the battery module 212 is faulty.

Figure 4:
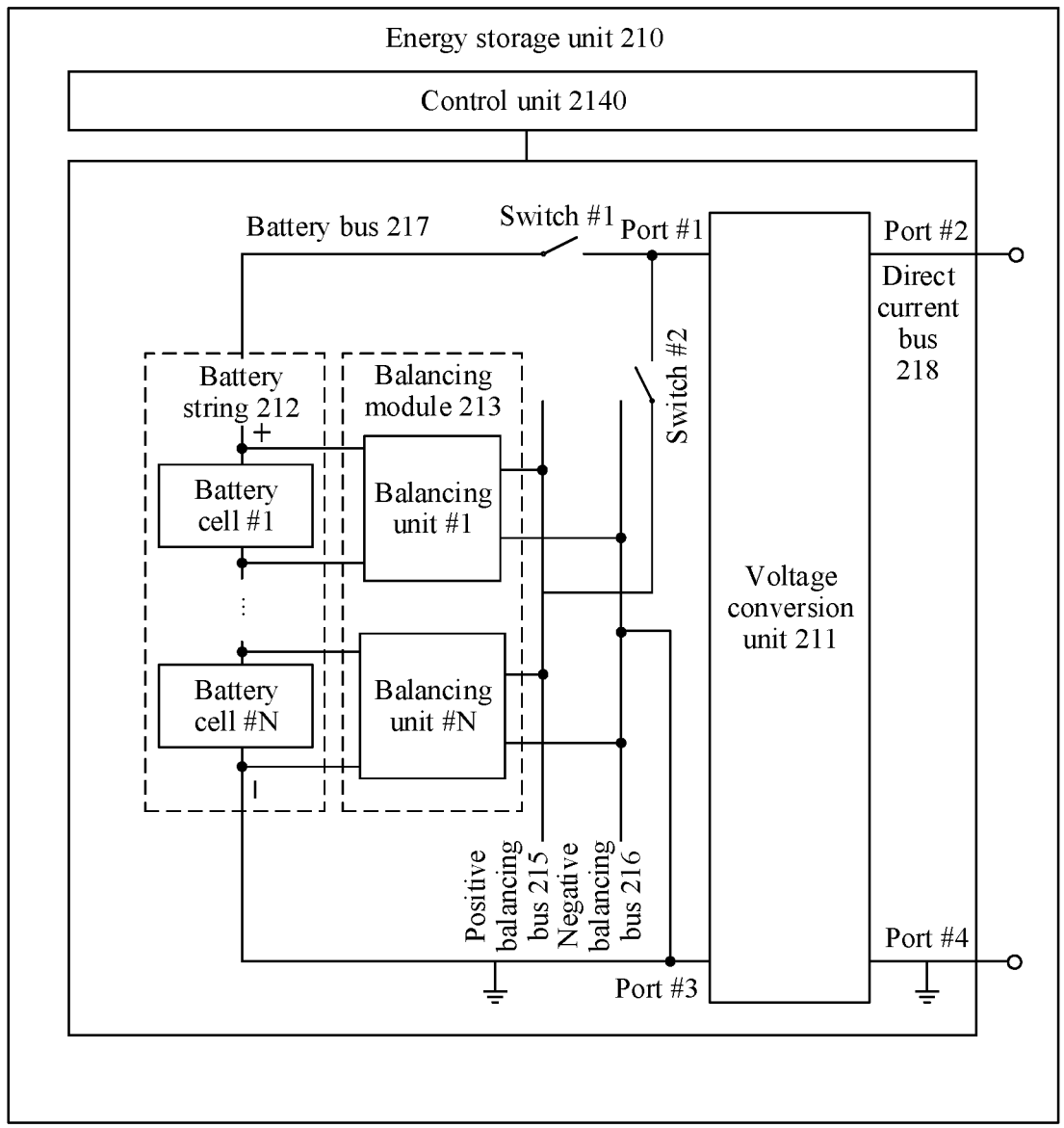
FIG. 4 is a schematic diagram of another energy storage unit according to an embodiment of this application.

The following further describes a structure of the energy storage unit 210 with reference to FIG. 4. The voltage conversion module 211 of the energy storage unit 210 includes a voltage conversion unit 211. The battery module 212 (that is, a battery string 212) includes a battery cell #1 to a battery cell #N. The balancing module 213 includes a balancing unit #1 to a balancing unit #N, where N is a positive integer. The control module 214 includes a switch #1 (that is, a first switch), a switch #2 (that is, a second switch), and a control unit 2140. The N balancing units are in a one-to-one correspondence with the N battery cells. A discharged state of the energy storage unit 210 is used as an example, each battery cell is connected in parallel to an input end of a balancing unit corresponding to the battery cell, output ends of the N balancing units are connected in parallel to each other, positive output ends of the N balancing units are connected to a positive balancing bus 215, and negative output ends of the plurality of balancing units are connected to a negative balancing bus 216, and the negative balancing bus 216 is grounded. An input end of the voltage conversion unit 211 is connected to a positive electrode of the battery string 212 by using a battery bus 217. The switch #1 is disposed between the positive electrode of the battery string 212 and the positive input end (namely, a port #1) of the voltage conversion unit 211 (or the switch #1 is located on the battery bus 217). The switch #2 is disposed between the positive balancing bus 215 and the positive input end of the voltage conversion unit 211 (or the switch #2 is disposed between the positive balancing bus 215 and the battery bus 217).

The N balancing units (namely, the balancing module 213) are configured to control SOC balancing between the battery cells, and the voltage conversion unit 211 is configured to perform voltage conversion to implement charging/discharging management on the battery string 212. The switch #1 and the switch #2 are configured to ensure that the energy storage unit can still work continuously when a specific battery cell or some battery cells in the energy storage unit 210 are faulty. The control unit 2140 is configured to control the switch #1 and the switch #2 to be closed or open.

In this embodiment of this application, a connection relationship between battery cells in a charging/discharging process of the energy storage unit 210 can be changed only by controlling connection statuses of the switch #1 and the switch #2 by using the control unit 2140. A control manner is simple and easy to implement, and implementation costs are low. This can significantly improve reliability of the energy storage system with low costs.

In a possible implementation, the N balancing units may control SOC balance between the battery cells in the following manner: The N battery cells may perform charging/discharging by using the N balancing units, to achieve SOC balance between the battery cells, and a corresponding charge/discharge current may be transferred by using the positive balancing bus 215 and the negative balancing bus 216. The N battery cells, the N balancing units, and the two balancing buses may be considered as an independent charge/discharge loop.

In a possible implementation, the control unit 2140 controls the connection statuses of the switch #1 and the switch #2 to ensure that the energy storage unit 210 can still continuously work when a battery cell in the battery string 212 is faulty. The following describes an example of the control manner of the control unit 2140.

In a normal working state, in other words, when the N battery cells are not faulty, the control unit 2140 controls the switch #1 to be in a closed state and the switch #2 to be in an open state. In the state, the voltage conversion unit 211 receives a voltage by using the battery bus 217. In this case, the connection relationship between the N battery cells in the charging/discharging process of the energy storage unit 210 may be equivalently considered as a series connection. In this case, the plurality of battery cells are connected in series, so that the energy storage unit obtains maximum output power, battery resources are fully used, and benefits are maximized.

In a battery cell fault state, in other words, when one or some of the N battery cells are faulty, the control unit 2140 may control the switch #1 to be open and the switch #2 to be closed. In the state, the voltage conversion unit 211 receives a voltage by using the positive balancing bus 215. In this case, the connection relationship between the N battery cells in the charging/discharging process of the energy storage unit 210 may be equivalently considered as a parallel connection, a fault of one or some battery cells does not affect continuous working of the energy storage unit, and other battery cells that are not faulty can still perform charging/discharging.

In comparison with the conventional technology in which when one or some battery packs are faulty, an entire battery cluster is shut down until repair of the faulty battery packs is completed, the energy storage unit 210 in this application can fully use time resources, the entire energy storage unit 210 can still obtain benefits when one or some battery cells are faulty, and availability of the energy storage system in a case of a battery cell fault can be greatly improved only with relatively low costs.

It should be understood that, in the foregoing descriptions, input ends and output ends of the N balancing units and the voltage conversion unit 211 are described by using a discharged state of the energy storage unit 210 as an example. In a charged state of the corresponding energy storage unit 210, the output end may also be used as an input end, and similarly, the input end may also be used as an output end. For example, in the discharged state of the energy storage unit 210, the port #1 of the voltage conversion unit 211 is a positive input end, a port #2 is a positive output end, a port #3 is a negative input end, and a port #4 is a negative output end. In the charged state of the energy storage unit 210, and in the discharged state of the energy storage unit 210, the port #1 of the voltage conversion unit 211 is a positive output end, the port #2 is a positive input end, the port #3 is a negative output end, and the port #4 is a negative input end. It should be noted that both the port #3 and the port #4 of the voltage conversion unit 211 are grounded, to further improve safety performance of the energy storage system.

It should be further understood that a voltage difference between the balancing bus and the battery bus is usually relatively large. In consideration of circuit safety, the balancing bus cannot be directly connected to the battery bus. Therefore, if switching needs to be performed on the switch #1 and the switch #2 when a battery cell in the energy storage unit is faulty, there is a time sequence requirement for performing switching on the switch #1 and the switch #2, and the switch #1 needs to be open before the switch #2 is closed.

It should be noted that, when the energy storage system is in a working state, the connection statuses of the switch #1 and the switch #2 are opposite. For example, when the switch #1 is in the closed state, the switch #2 is in the open state, or when the switch #2 is in the closed state, the switch #1 is in the open state.

In the foregoing embodiment, the negative balancing bus 216 is grounded in both the normal working state and the battery cell fault state. Because in the normal working state, the balancing bus is isolated from the balancing bus 217, the negative balancing bus 216 may not be grounded. In other words, only in the battery cell fault state, the balancing bus and the battery bus 217 may be released from an isolated state, and the negative balancing bus 216 may be grounded, to prevent all balancing units on the bus from being failed because a high voltage is applied to the positive balancing bus. The following describes this embodiment with reference to FIG. 5.

Figure 5:
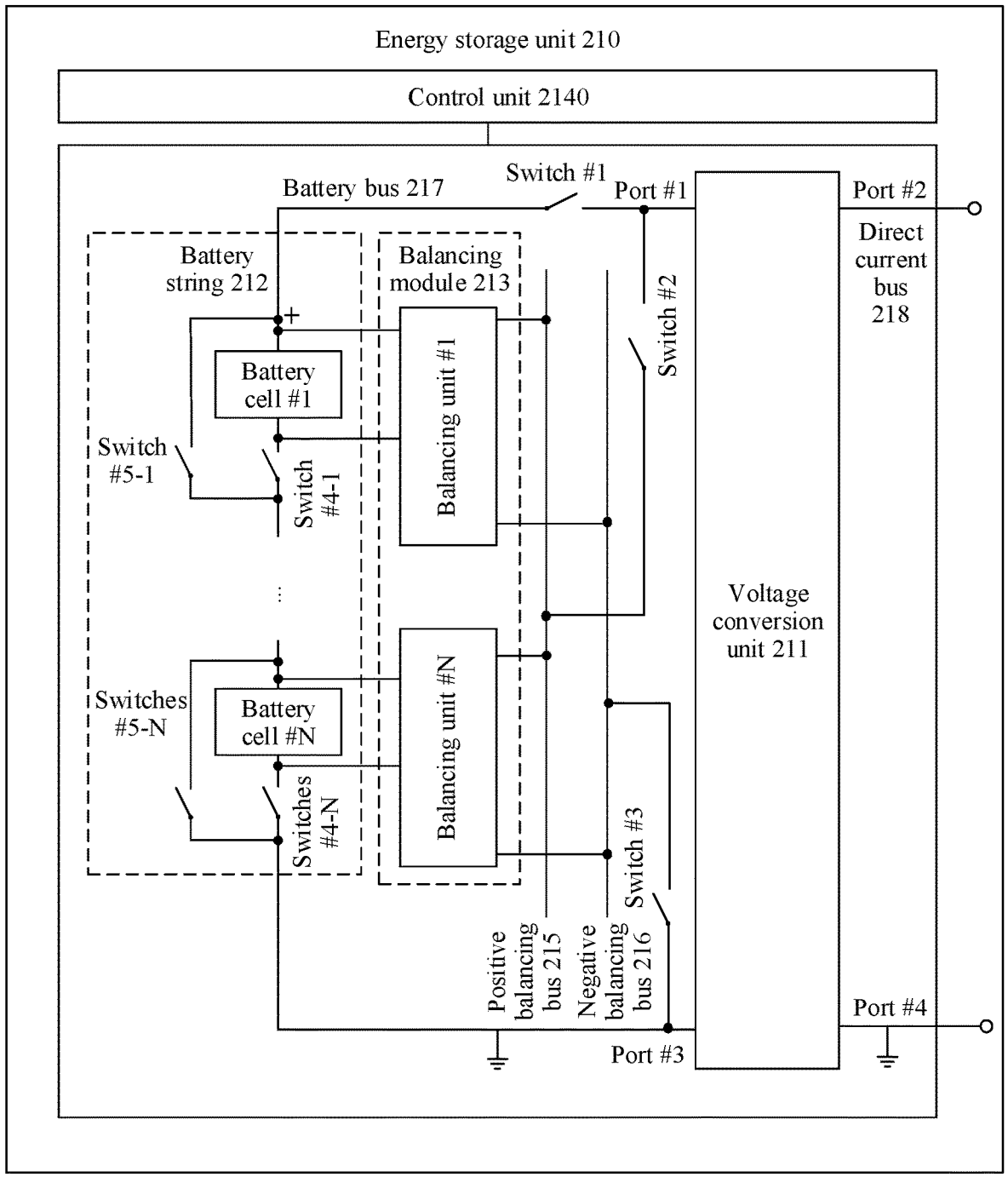
FIG. 5 is a schematic diagram of still another energy storage unit according to an embodiment of this application.

As shown in FIG. 5, when the negative balancing bus 216 is not grounded, the energy storage unit further includes a switch #3, or the control module 214 further includes a switch #3. The switch #3 is separately connected to the negative balancing bus 216 and the port #3 or the port #4 of the voltage conversion unit 211, and both the port #3 and the port #4 of the voltage conversion unit 211 are grounded.

The switch #3 is configured to prevent all balancing units on the bus from being failed because a high voltage is applied to the positive balancing bus when a battery cell is faulty, so that reliability of the energy storage unit is further improved.

In a possible implementation, the energy storage unit includes the switch #1, the switch #2, and the switch #3. The control unit 2140 controls connection statuses of the switch #1, the switch #2, and the switch #3 to ensure that the energy storage unit 210 can still continuously work when a battery cell in the battery string 212 is faulty. The following describes an example of the control manner of the control unit 2140.

In a normal working state, in other words, when the N battery cells are not faulty, the control unit 2140 controls the switch #1 to be in a closed state and both the switch #2 and the switch #3 to be in an open state. In this case, the balancing bus and the battery bus are in an isolated state (or a floating state).

In a battery cell fault state, in other words, when one or some of the N battery cells are faulty, the control unit 2140 may control the switch #1 to switch from the closed state to the open state and the switch #2 and the switch #3 to switch from the open state to the closed state. In this case, the balancing bus and the battery bus are released from an isolated state, and the switch #3 can prevent all balancing units on the bus from being failed because a high voltage is applied to the positive balancing bus when conglutination occurs in the switch #2 or a time sequence for performing switching on the switch #1 and the switch #2 is incorrect.

In the foregoing embodiments of this application, when a battery cell is faulty, the control unit 2140 controls the switch #1 to be open and the switch #2 to be closed (and the switch #3 to be closed), so that the voltage conversion unit 211 receives a voltage by using the positive balancing bus 215. In this case, the connection relationship between the N battery cells in the charging/discharging process of the energy storage unit may be equivalently considered as being changed from a series connection to a parallel connection. In the following embodiments, there are two battery cell fault cases based on a quantity of faulty battery cells. In the first fault case, the quantity of faulty battery cells in the N battery cells is less than a preset threshold. In the second fault case, the quantity of faulty battery cells in the N battery cells is greater than or equal to the preset threshold. The following further describes embodiments of this application for the two cases with reference to FIG. 5.

As shown in FIG. 5, in another possible implementation, the energy storage unit 210 further includes N switches #4 and N switches #5, and the N switches #4, the N switches #5, and the N battery cells are in a one-to-one correspondence. Each switch #4 is connected in series to a battery cell corresponding to the switch #4. For example, a switch #4-1 is connected in series to a battery cell #1 corresponding to the switch #4-1. Each switch #5 is connected in parallel to a battery cell corresponding to the switch #5 and a switch #4 corresponding to the switch #5. For example, a switch #5-1 is connected in parallel to the battery cell #1 and the switch #4-1 that correspond to the switch #5-1.

The N switches #4 are configured to connect battery cells that are not faulty. In other words, when a battery cell is faulty, a switch #4 corresponding to the faulty battery cell is in an open state, which is equivalent to removing the faulty battery cell from the energy storage unit. The N switches #5 are configured to bypass faulty battery cells corresponding to the N switches #5. In other words, when a battery cell is faulty, a switch #5 corresponding to the faulty battery cell is in a closed state, and a function implemented by the switch #5 may be equivalently considered as a wire.

The switch #4 and the switch #5 may be used together, so that the energy storage unit can still continuously work when a battery cell is faulty.

In a possible implementation, the energy storage unit 210 includes the switch #1, the switch #2, the N switches #4, and the N switches #5, or the control module 214 includes the switch #1, the switch #2, the N switches #4, and the N switches #5. In this case, the negative balancing bus 216 may be grounded by default. The control unit 2140 controls connection statuses of the switch #1, the switch #2, the N switches #4, and the N switches #5 to ensure that the energy storage unit 210 can still continuously work when a battery cell in the battery string 212 is faulty. The following describes an example of the control manner of the control unit 2140.

In a normal working state, the N battery cells are not faulty, the control unit 2140 controls the switch #1 and the N switches #4 to be in a default closed state and the switch #2 and the N switches #5 to be in a default open state. In the connection state, the voltage conversion unit 211 receives a voltage by using the battery bus 217. In this case, the connection relationship between the N battery cells in the charging/discharging process of the energy storage unit may be equivalently considered as a series connection.

In the first fault case, a quantity of faulty battery cells in the N battery cells is less than a preset threshold, and in this case, the first fault working mode may be used. The control unit 2140 controls the switch #1 to remain in the closed state and the switch #2 to remain in the open state. The control unit 2140 controls a switch #4 corresponding to the faulty battery cell to switch from the closed state to the open state, and controls a switch #5 corresponding to the faulty battery cell to switch from the open state to the closed state, to remove the faulty battery cell from the energy storage unit, so that it is ensured that battery cells that are not faulty in the energy storage unit can still continuously work. In the connection state, the voltage conversion unit 211 still receives a voltage by using the battery bus 217, and a connection relationship between the other battery cells that are not faulty in the charging/discharging process of the energy storage unit may still be equivalently considered as a series connection.

In the second fault case, when a quantity of faulty battery cells in the N battery cells is greater than or equal to the preset threshold, the second fault working mode may be used. The control unit 2140 controls the N switches #4 to remain in the closed state and the N switches #5 to remain in the open state. The control unit 2140 controls the switch #1 to switch from the closed state to the open state, and controls the switch #2 to switch from the open state to the closed state. In the connection state, the voltage conversion unit 211 receives a voltage by using the positive balancing bus 215. In this case, the connection relationship between the N battery cells in the charging/discharging process of the energy storage unit may be equivalently considered as a parallel connection, a fault of one or some battery cells does not affect continuous working of the energy storage unit, the voltage conversion unit can still perform charging/discharging management on other battery cells that are not faulty.

In a possible implementation, the energy storage unit 210 includes the switch #1, the switch #2, the switch #3, the N switches #4, and the N switches #5, or the control module 214 includes the switch #1, the switch #2, the switch #3, the N switches #4, and the N switches #5. In this case, the negative balancing bus 216 is not grounded by default. The control unit 2140 controls connection statuses of the switch #1, the switch #2, the switch #3, the N switches #4, and the N switches #5 to ensure that the energy storage unit 210 can still continuously work when a battery cell in the battery string 212 is faulty.

It should be understood that, based on the described function of the switch #3, a connection status of the switch #3 is related to connection statuses of the switch #1 and the switch #2. Specifically, when the switch #1 is closed and the switch #2 is open, the switch #3 is open, or when the switch #1 is open and the switch #2 is closed, the switch #3 is closed, to prevent all balancing units from being failed because a high voltage is applied to the positive balancing bus. For a specific use manner in different cases, refer to the foregoing example descriptions of the switch #1, the switch #2, the N switches #4, and the N switches #5 used together.

It should be further understood that if the energy storage unit further includes the N switches #4 and the N switches #5, using the processing manner of the second fault case for the first fault case can also ensure normal working of the energy storage unit, but a processing manner that is the same as that of the first fault case cannot be used for the second fault case. A reason is as follows: The voltage conversion unit may have a specific working voltage range. When a total voltage of other battery cells that are not faulty cannot reach a minimum voltage limit of the voltage conversion unit, the voltage conversion unit cannot work normally, and cannot perform charging/discharging management on the other battery cells that are not faulty. In this case, the switch #1 may be open and the switch #2 may be closed to change the connection relationship between the battery cells in the charging/discharging process of the energy storage unit, so that a minimum voltage requirement of the voltage conversion unit can be met, and the voltage conversion unit can perform charging/discharging management on the battery cells within the working voltage range of the voltage conversion unit.

It should be noted that if the energy storage unit further includes the N switches #4 and the N switches #5, the preset threshold for the quantity of battery cells may be set based on a related parameter of the voltage conversion unit. For example, the preset threshold for the quantity of battery cells may be set based on the minimum voltage limit of the voltage conversion unit. If a voltage provided by other battery cells that are not faulty is less than the minimum voltage limit of the voltage conversion unit, it may be considered that the quantity of faulty battery cells in the N battery cells is greater than the preset threshold.

It should be further noted that, in the normal working state, the N switches #4 are closed by default and the N switches #5 are open by default. When a switch #4 and a switch #5 that correspond to a faulty battery cell are adjusted to ensure normal working of the energy storage unit, to prevent the faulty battery cell from being short-circuited, there is a specific time sequence requirement for performing switching on the switch #4 and the switch #5. Specifically, the switch #4 corresponding to the faulty battery cell may be preferentially open before the switch #5 corresponding to the faulty battery cell is closed.

In another possible implementation, the energy storage unit may further include at least one switch #4 and at least one switch #5 corresponding to the switch #4. It may be understood that only corresponding switches #4 and switches #5 are disposed for one or some of the N battery cells. When the first fault occurs in a battery cell for which a corresponding switch #4 and switch #5 are disposed, connection statuses of the switch #4 and the switch #5 that correspond to the faulty battery cell may be controlled to remove the faulty battery cell from the energy storage unit, so that it is ensured that battery cells that are not faulty in the energy storage unit can still continuously work. When a battery cell for which no corresponding switch #4 and switch #5 are disposed is faulty, or when the second fault case occurs in a battery cell for which a corresponding switch #4 and switch #5 are disposed, the connection statuses of the switch #1 and the switch #2 may be controlled, so that the connection relationship between the N battery cells in the charging/discharging process of the energy storage unit can be equivalently considered as a parallel connection, and the energy storage unit can continuously work. For a specific implementation, refer to the foregoing embodiment of the N switches #4 and the N switches #5. Details are not described herein again in this application.

It should be noted that if the energy storage unit includes at least one switch #4 and at least one switch #5 corresponding to the switch #4, the switch #4 and the switch #5 may also be faulty. For example, in a normal working state, the switch #4 is closed by default and the switch #5 is open by default. If one or some of the switches are broken, and cannot be in a default connection state, the connection statuses of the switch #1 and the switch #2 may be controlled to switch to the second fault working mode (in other words, the switch #1 is open and the switch #2 is closed) to ensure that the energy storage unit can still continuously work.

It should be further noted that in a case of a fault of a battery cell, when the voltage conversion unit receives the voltage by using the positive balancing bus by controlling the switch #1 and the switch #2, the N battery cells can perform charging/discharging by using the N corresponding balancing units, to achieve SOC balance, and in addition, the N battery cells can perform charging/discharging by using the N corresponding balancing units and the voltage conversion unit. In other words, in this case, the balancing unit can control both SOC balance between the battery cells and output power of the battery cells.

It should be further noted that the control unit 2140 in the energy storage system is configured to control switching and a switching time sequence of switches in each energy storage unit. For example, the control unit may be a micro controller unit (MCU) or a digital signal processor (DSP) unit. A specific type of the control unit is not limited in this application, provided that a same or similar function can be implemented.

It should be further noted that the control unit 2140 may be integrated into the voltage conversion unit 211, may be integrated into another module, or may be independently disposed. A specific implementation of the control unit is not limited in this application. Similarly, the switch #1 to the switch #5 may be integrated into the voltage conversion unit, may be integrated into another module, or may be independently disposed. Specific implementations of the switches are not limited in this application.

It should be further noted that the switch #1 to the switch #5 are mainly configured to open or close a circuit. For example, the switch may be a contactor, a relay, a circuit breaker, or an electronic switch (for example, a metal-oxide-semiconductor field-effect transistor (MOSFET) or an insulated gate bipolar transistor (IGBT)). A specific type of the switch is not limited in this application, provided that a same or similar function can be implemented.

It should be further noted that the battery cell in the battery string 212 includes at least one battery pack, and each battery pack includes at least one electrochemical cell.

It should be further noted that the balancing unit in the balancing module includes but is not limited to a direct current to direct current (DC-DC) converter.

It should be further noted that the voltage conversion unit 211 includes but is not limited to a direct current to direct current (DC-DC) converter or a power conversion system (PCS). The voltage conversion unit 211 may be isolated, or may be non-isolated.

Optionally, a fuse may be further disposed on a wire in the energy storage unit 210, for example, a fuse is disposed on the battery bus 217, to prevent an excessively high current on the bus, so that circuit safety is further improved. For a manner of disposing the fuse herein, refer to the conventional technology. Details are not further described herein in this application.

Optionally, a circuit breaker may be further disposed on the battery bus 217 in the energy storage unit according to a safety specification. For a manner of disposing the circuit breaker herein, refer to the conventional technology. Details are not further described herein in this application.

The following describes in detail a method for controlling an energy storage unit in this application.

This application provides a method for controlling an energy storage unit. The energy storage unit includes a battery string, a plurality of balancing units, a voltage conversion unit, a first switch, a second switch, and a control unit. The battery string includes a plurality of battery cells. The plurality of balancing units are in a one-to-one correspondence with the plurality of battery cells, each battery cell is connected in parallel to an input end of a balancing unit corresponding to the battery cell, output ends of the plurality of balancing units are connected in parallel, positive output ends of the plurality of balancing units are connected to a positive balancing bus, negative output ends of the plurality of balancing units are connected to a negative balancing bus, and the plurality of balancing units are configured to control state of charge balance between the battery cells. The voltage conversion unit is configured to perform voltage conversion, a positive input end of the voltage conversion unit is connected to a positive electrode of the battery string by using a battery bus, and a negative input end and a negative output end of the voltage conversion unit are grounded. The first switch is disposed between the positive electrode of the battery string and the positive input end of the voltage conversion unit. The second switch is disposed between the positive balancing bus and the positive input end of the voltage conversion unit. The method includes: The control unit controls the first switch to be closed and the second switch to be open, so that the voltage conversion unit receives a voltage by using the battery bus; or the control unit controls the first switch to be open and the second switch to be closed, so that the voltage conversion unit receives a voltage by using the positive balancing bus.

In the control method, when the battery cells are not faulty, the control unit may control the first switch to be closed and the second switch to be open, so that the voltage conversion unit receives the voltage by using the battery bus. In this case, a connection relationship between the plurality of battery cells in a charging/discharging process of the energy storage unit may be equivalently considered as a series connection. In this case, the plurality of battery cells are connected in series, so that the energy storage unit obtains maximum output power, battery resources are fully used, and benefits are maximized. When a battery cell is faulty, the control unit may control the first switch to be open and the second switch to be closed, so that the voltage conversion unit receives the voltage by using the positive balancing bus. In this case, a connection relationship between the plurality of battery cells in a charging/discharging process of the energy storage unit may be equivalently considered as a parallel connection, a fault of one or some battery cells does not affect continuous working of the energy storage unit, and other battery cells that are not faulty can still perform charging/discharging.

In a possible implementation, the negative balancing bus is grounded, and the method further includes: The control unit detects whether the plurality of battery cells are faulty. That the control unit controls the first switch to be closed and the second switch to be open, so that the voltage conversion unit receives a voltage by using the battery bus includes: When the plurality of battery cells are not faulty, the control unit controls the first switch to be closed and the second switch to be open. That the control unit controls the first switch to be open and the second switch to be closed, so that the voltage conversion unit receives a voltage by using the positive balancing bus includes: When one or more of the plurality of battery cells are faulty, the control unit controls the first switch to be open and the second switch to be closed.

In a possible implementation, the energy storage unit further includes a third switch, and the third switch is disposed between the negative balancing bus and the negative input end or the negative output end of the voltage conversion unit. The method further includes: The control unit detects whether the plurality of battery cells are faulty. That the control unit controls the first switch to be closed and the second switch to be open, so that the voltage conversion unit receives a voltage by using the battery bus includes: When the plurality of battery cells are not faulty, the control unit controls the first switch to be closed, the second switch to be open, and the third switch to be open. That the control unit controls the first switch to be open and the second switch to be closed, so that the voltage conversion unit receives a voltage by using the positive balancing bus includes: When one or more of the plurality of battery cells are faulty, the control unit controls the first switch to be open, the second switch to be closed, and the third switch to be closed.

In a possible implementation, the energy storage unit further includes: a plurality of fourth switches, where each battery cell is connected in series to a fourth switch corresponding to the battery cell; and a plurality of fifth switches, where the plurality of fourth switches, the plurality of fifth switches, and the plurality of battery cells are in a one-to-one correspondence, and each battery cell is connected in parallel to a fifth switch corresponding to the battery cell. The method further includes: The control unit detects whether the plurality of battery cells are faulty. That the control unit controls the first switch to be closed and the second switch to be open, so that the voltage conversion unit receives a voltage by using the battery bus includes: When a quantity of faulty battery cells in the plurality of battery cells is less than a preset threshold, the control unit controls the first switch to be closed, the second switch to be open, a fourth switch corresponding to the faulty battery cell to be open, and a fifth switch corresponding to the faulty battery cell to be closed. That the control unit controls the first switch to be open and the second switch to be closed, so that the voltage conversion unit receives a voltage by using the positive balancing bus includes: When a quantity of faulty battery cells in the plurality of battery cells is greater than or equal to the preset threshold, the control unit controls the first switch to be open, the second switch to be closed, a fourth switch corresponding to the faulty battery cell to be closed, and a fifth switch corresponding to the faulty battery cell to be open.

This application further provides an energy storage system. The energy storage system includes at least one energy storage unit described in the foregoing embodiments.

In a possible implementation, the energy storage system further includes a bus bar and at least one inverter, the bus bar is configured to integrate currents output by energy storage units in the energy storage system, and the inverter is configured to: convert a direct current into an alternating current and output the alternating current to a power grid.

This application further provides a method for controlling an energy storage system. The control method corresponds to a method for controlling an energy storage unit included in the foregoing energy storage system.

Figure 6:
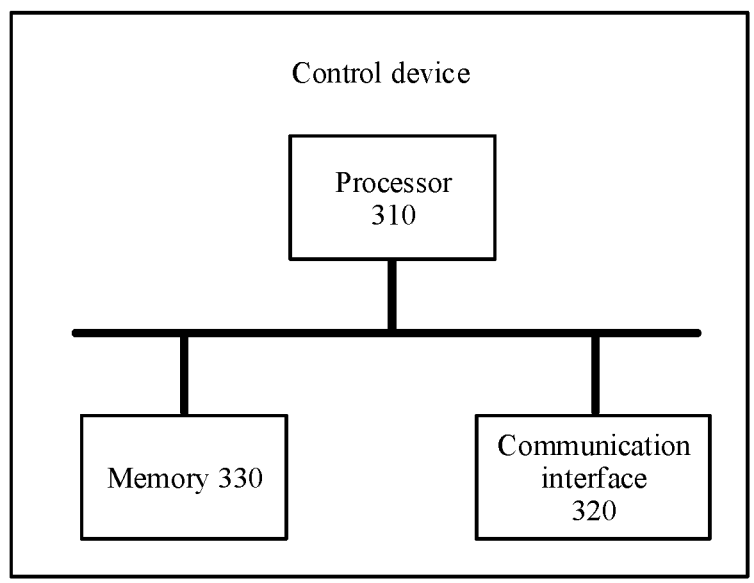
FIG. 6 is a schematic diagram of a structure of a control device according to an embodiment of this application.

FIG. 6 is a schematic diagram of a structure of a control device 300 according to an embodiment of this application. As shown in FIG. 6, the control device 300 includes a processor 310 and a communication interface 320. Optionally, the control device may further include a memory 330. Optionally, the memory 330 may be included in the processor 310. The processor 310, the communication interface 320, and the memory 330 communicate with each other by using an internal connection path, the memory 330 is configured to store instructions, and the processor 310 is configured to execute the instructions stored in the memory 330, to implement the control method provided in embodiments of this application.

Optionally, the control device may be configured to perform functions of the control unit 2140 in FIG. 4 and FIG. 5.

It should be noted that the embodiments in this specification are all described in a progressive manner, for same or similar parts in the embodiments, refer to these embodiments, and each embodiment focuses on a difference from other embodiments. Especially, system or system embodiments are basically similar to a method embodiment, and therefore are described briefly; for related parts, refer to partial descriptions in the method embodiment. The described system and system embodiments are merely examples. The units described as separate parts may or may not be physically separate, and parts displayed as units may or may not be physical units, may be located in one position, or may be distributed on a plurality of network units. Some or all the modules may be selected based on an actual requirement to achieve the objectives of the solutions of embodiments. A person of ordinary skill in the art may understand and implement embodiments without creative efforts.

It should be noted that in this specification, relational terms such as first, second, "#1", and "#2" are only used to distinguish one entity or operation from another, and do not necessarily require or imply that any actual relationship or sequence exists between these entities or operations. Moreover, the terms "include", "comprise", or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

In several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on multiple network units. Some or all of the units may be selected depending on actual requirements to achieve the objectives of the solutions in the embodiments.

In addition, functional units in the embodiments of this application may be integrated into one unit, or each of the units may exist alone physically, or two or more units are integrated into one unit.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An energy storage device comprising:
    a battery string, comprising a plurality of battery cells;
    a plurality of balancing controllers, which are in a one-to-one correspondence with the plurality of battery cells, and are configured to control state of charge balance between the battery cells;
        wherein each battery cell is connected in parallel to an input end of a balancing controller associated with the battery cell, output ends of the plurality of balancing controllers are connected in parallel, positive output ends of the plurality of balancing controllers are connected to a positive balancing bus, negative output ends of the plurality of balancing controllers are connected to a negative balancing bus;
    a voltage converter, configured to perform voltage conversion, wherein a positive input end of the voltage converter is connected to a positive electrode of the battery string by using a battery bus, and a negative input end and a negative output end of the voltage converter are grounded;
    a first switch, disposed between the positive electrode of the battery string and the positive input end of the voltage converter;

a second switch, disposed between the positive balancing bus and the positive input end of the voltage converter; and a controller, configured to: control the first switch to be closed and the second switch to be open, to enable the voltage converter to receive a voltage by using the battery bus; or control the first switch to be open and the second switch to be closed, to enable the voltage converter to receive a voltage by using the positive balancing bus.

2. The energy storage device according to claim 1, wherein the negative balancing bus is grounded; and the controller is further configured to:
in response to the plurality of battery cells being not faulty, control the first switch to be closed and the second switch to be open; and
in response to one or more of the plurality of battery cells being faulty, control the first switch to be open and the second switch to be closed.

3. The energy storage device unit according to claim 1, further comprising:
a third switch, disposed between the negative balancing bus and the negative input end of the voltage converter; and
wherein the controller is further configured to:
in response to the plurality of battery cells being not faulty, control the first switch to be closed, the second switch to be open, and the third switch to be open; and
in response to one or more of the plurality of battery cells being faulty, control the first switch to be open, the second switch to be closed, and the third switch to be closed.

4. The energy storage device according to claim 1, further comprising:
a plurality of fourth switches, wherein each battery cell is connected in series to a fourth switch associated with the battery cell; and
a plurality of fifth switches, wherein the plurality of fourth switches, the plurality of fifth switches, and the plurality of battery cells are in a one-to-one correspondence, and each battery cell is connected in parallel to a fifth switch associated with the battery cell.

5. The energy storage device according to claim 4, wherein the controller is further configured to:
in response to a quantity of faulty battery cells in the plurality of battery cells being less than a preset threshold, control the first switch to be closed, the second switch to be open, a fourth switch associated with the faulty battery cell to be open, and a fifth switch associated with the faulty battery cell to be closed; and
in response to a quantity of faulty battery cells in the plurality of battery cells being greater than or equal to the preset threshold, control the first switch to be open, the second switch to be closed, a fourth switch associated with the faulty battery cell to be closed, and a fifth switch associated with the faulty battery cell to be open.

6. A method for controlling an energy storage device, wherein the energy storage device comprises a battery string comprising a plurality of battery cells, a plurality of balancing controllers, a voltage converter, a first switch, a second switch, and a controller, wherein
the method comprises:
controlling, by the plurality of balancing controllers, state of charge balance between the battery cells;
performing, by the voltage converter, voltage conversion;
controlling, by the controller, the first switch to be closed and the second switch to be open, to enable the voltage converter to receive a voltage by using the battery bus; or
controlling, by the controller, the first switch to be open and the second switch to be closed, to enable the voltage converter to receive a voltage by using the positive balancing bus; and
wherein the plurality of balancing controllers are in a one-to-one association with the plurality of battery cells,
wherein each battery cell is connected in parallel to an input end of a balancing controller associated with the battery cell,
wherein output ends of the plurality of balancing controllers are connected in parallel,
wherein positive output ends of the plurality of balancing controllers are connected to a positive balancing bus, and
wherein negative output ends of the plurality of balancing controllers are connected to a negative balancing bus:
a positive input end of the voltage converter is connected to a positive electrode of the battery string by using a battery bus, and a negative input end and a negative output end of the voltage converter are grounded;
the first switch is disposed between the positive electrode of the battery string and the positive input end of the voltage converter; and
the second switch is disposed between the positive balancing bus and the positive input end of the voltage converter.

7. The method according to claim 6, wherein the negative balancing bus is grounded, and the method further comprises:
detecting, by the controller, whether the plurality of battery cells are faulty;
controlling the first switch to be closed and the second switch to be open, to enable the voltage converter to receive the voltage by using the battery bus comprises: in response to the plurality of battery cells being not faulty, controlling, by the controller, the first switch to be closed and the second switch to be open; and
controlling, the first switch to be open and the second switch to be closed, to enable the voltage converter to receive the voltage by using the positive balancing bus comprises: in response to one or more of the plurality of battery cells being faulty, controlling, by the controller, the first switch to be open and the second switch to be closed.

8. The method according to claim 6, wherein the energy storage device further comprises a third switch, and the third switch is disposed between the negative balancing bus and the negative input end or the negative output end of the voltage converter, and wherein the method further comprises:
detecting, by the controller, whether the plurality of battery cells are faulty;
controlling the first switch to be closed and the second switch to be open, to enable the voltage converter to receive the voltage by using the battery bus comprises: in response to the plurality of battery cells being not faulty, controlling, by the controller, the first switch to be closed, the second switch to be open, and the third switch to be open; and controlling the first switch to be open and the second switch to be closed, to enable the voltage converter to receive the voltage by using the positive balancing bus comprises: in response to one or more of the plurality of battery cells being faulty, controlling, by the controller, the first switch to be open, the second switch to be closed, and the third switch to be closed.

9. The method according to claim 6, wherein the energy storage device further comprises:
   a plurality of fourth switches, wherein each battery cell is connected in series to a fourth switch associated with the battery cell; and
   a plurality of fifth switches, wherein the plurality of fourth switches, the plurality of fifth switches, and the plurality of battery cells are in a one-to-one association, and each battery cell is connected in parallel to a fifth switch associated with the battery cell; and
   wherein the method further comprises:
   detecting, by the controller, whether the plurality of battery cells are faulty;
   controlling the first switch to be closed and the second switch to be open, to enable the voltage converter to receive the voltage by using the battery bus comprises: in response to a quantity of faulty battery cells in the plurality of battery cells being less than a preset threshold, controlling, by the controller, the first switch to be closed, the second switch to be open, a fourth switch associated with the faulty battery cell to be open, and a fifth switch associated with the faulty battery cell to be closed; and
   controlling the first switch to be open and the second switch to be closed, to enable the voltage converter to receive the voltage by using the positive balancing bus comprises: in response to a quantity of faulty battery cells in the plurality of battery cells being greater than or equal to the preset threshold, controlling, by the controller, the first switch to be open, the second switch to be closed, a fourth switch associated with the faulty battery cell to be closed, and a fifth switch associated with the faulty battery cell to be open.

10. An energy storage system comprising at least one energy storage device, and the at least one energy storage device comprising:
    a battery string comprising a plurality of battery cells;
    a plurality of balancing controllers, each of which being in a one-to-one association with one of the plurality of battery cells, and the plurality of balancing controllers are configured to control state of charge balance among the battery cells;
      wherein each battery cell is connected in parallel to an input end of a balancing controller associated with the battery cell,
      wherein output ends of the plurality of balancing controllers are connected in parallel,
      wherein positive output ends of the plurality of balancing controllers are connected to a positive balancing bus, and
    wherein negative output ends of the plurality of balancing controllers are connected to a negative balancing bus;
    a voltage converter configured to perform voltage conversion, wherein a positive input end of the voltage converter is connected to a positive electrode of the battery string by using a battery bus, and a negative input end and a negative output end of the voltage converter are grounded;
    a first switch disposed between the positive electrode of the battery string and the positive input end of the voltage converter;
    a second switch disposed between the positive balancing bus and the positive input end of the voltage converter; and
    a controller configured to control the first switch to be closed and the second switch to be open, thereby enabling the voltage converter to receive a voltage by using the battery bus; or control the first switch to be open and the second switch to be closed, thereby enabling the voltage converter to receive a voltage by using the positive balancing bus.

11. The energy storage system according to claim 10, wherein the negative balancing bus is grounded; and the controller is further configured to:
    in response to the plurality of battery cells being not faulty, control the first switch to be closed and the second switch to be open; and
    in response to one or more of the plurality of battery cells being faulty, control the first switch to be open and the second switch to be closed.

12. The energy storage system according to claim 10, wherein the energy storage device further comprises:
    a third switch disposed between the negative balancing bus and the negative input end of the voltage converter; and
    the controller is further configured to:
      in response to the plurality of battery cells being not faulty, control the first switch to be closed, the second switch to be open, and the third switch to be open; and
      in response to one or more of the plurality of battery cells being faulty, control the first switch to be open, the second switch to be closed, and the third switch to be closed.

13. The energy storage system according to claim 10, wherein the energy storage device further comprises:
    a plurality of fourth switches, wherein each battery cell is connected in series to a fourth switch associated with the battery cell;
    each of a plurality of fifth switches is in a one-to-one association with one of the plurality of fourth switches and one of the plurality of battery cells, wherein each battery cell is connected in parallel to the associated fifth switch.

14. The energy storage system according to claim 13, wherein the controller is further configured to:
    in response to a quantity of faulty battery cells in the plurality of battery cells being less than a preset threshold, control the first switch to be closed, the second switch to be open, a fourth switch associated with the faulty battery cell to be open, and a fifth switch associated with the faulty battery cell to be closed; and
    in response to a quantity of faulty battery cells in the plurality of battery cells being greater than or equal to the preset threshold, control the first switch to be open, the second switch to be closed, a fourth switch associated with the faulty battery cell to be closed, and a fifth switch associated with the faulty battery cell to be open.

* * * * *

UNITED STATES PATENT AND TRADEMARK OFFICE
CERTIFICATE OF CORRECTION

PATENT NO. : 12,272,973 B2
APPLICATION NO. : 17/719130
DATED : April 8, 2025
INVENTOR(S) : Li et al.

Page 1 of 1

It is certified that error appears in the above-identified patent and that said Letters Patent is hereby corrected as shown below:

In the Claims

Claim 3: Column 21, Line 20: "The energy storage device unit according to claim 1," should read as -- The energy storage device according to claim 1, --.

Claim 6: Column 22, Line 22: "balancing bus:" should read as -- balancing bus; --.

Signed and Sealed this
Thirtieth Day of September, 2025

John A. Squires
*Director of the United States Patent and Trademark Office*